United States Patent
Numnual et al.

(10) Patent No.: US 8,366,331 B2
(45) Date of Patent: Feb. 5, 2013

(54) BLADE DRIVING DEVICE AND OPTICAL APPARATUS

(75) Inventors: Phichet Numnual, Pathumthani (TH); Takashi Nakano, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 7 days.

(21) Appl. No.: 13/191,810

(22) Filed: Jul. 27, 2011

(65) Prior Publication Data

US 2012/0024126 A1 Feb. 2, 2012

Related U.S. Application Data

(63) Continuation of application No. PCT/JP2009/070212, filed on Dec. 2, 2009.

(30) Foreign Application Priority Data

Mar. 10, 2009 (JP) .................................. 2009-57181

(51) Int. Cl.
*G03B 9/20* (2006.01)
(52) U.S. Cl. ....................................................... 396/497
(58) Field of Classification Search .................. 396/493, 396/497, 510, 489
See application file for complete search history.

(56) References Cited

U.S. PATENT DOCUMENTS 6,767,145 B2 * 7/2004 Eguro ........................... 396/497
2008/0175584 A1 7/2008 Ohkuma
2010/0220993 A1 * 9/2010 Sawanobori et al. ......... 396/510
2011/0222845 A1 * 9/2011 Osoniwa et al. .............. 396/510

FOREIGN PATENT DOCUMENTS

| JP | 62-53429 | 4/1987 |
| JP | 11-133479 | 5/1999 |
| JP | 2004-61897 A1 | 2/2004 |
| JP | 2005-195817 A1 | 7/2005 |
| JP | 2005-283877 A1 | 10/2005 |
| JP | 2006-171547 A1 | 6/2006 |
| JP | 2007-93912 A1 | 4/2007 |
| JP | 2007-322631 A1 | 12/2007 |
| JP | 2008-176062 A1 | 7/2008 |

OTHER PUBLICATIONS

International Search Report for International Application No. PCT/JP2009/070212 dated Dec. 17, 2009.

* cited by examiner

*Primary Examiner* — Christopher Mahoney
(74) *Attorney, Agent, or Firm* — Kratz, Quintos & Hanson, LLP

(57) ABSTRACT

A blade driving device includes: a board including an optical path opening; first and second blades moving toward and away from the optical path opening; first and second transmitting portions driving the first and second blades; and first and second drive sources respectively driving the first and second transmitting portions, wherein the first and second transmitting portions respectively include first and second drive pins, and the first blade includes an engagement slot engaging one of the first and second drive pins and is attached to the first and the second transmitting portions to be rotatable about the other of the first and second drive pins.

9 Claims, 5 Drawing Sheets

BLADE DRIVING DEVICE AND OPTICAL APPARATUS

CROSS-REFERENCE TO RELATED APPLICATION

This application is a continuation of and claims priority to International Patent Application No. PCT/JP2009/070212 filed on Dec. 2, 2009, which claims priority to Japanese Patent Application No. 2009-057181 filed on Mar. 10, 2009, subject matter of these patent documents is incorporated by reference herein in its entirety.

BACKGROUND (i) Technical Field

The present invention relates to blade driving devices and optical apparatus.

(ii) Related Art

There is known a blade driving device employed in an optical apparatus. The blade driving device is quipped with plural blades which open and close an optical path opening formed in a board. The plural blades are independently driven by plural drive sources (Japanese Unexamined Patent Application Publication No. 2006-171547).

When the plural drive sources are employed in the blade driving device, the plural drive sources are arranged as close as possible to each other, thereby reducing the whole size of the blade driving device. When the plural drive sources are arranged apart from each other, it is necessary to provide individually members housing the drive sources respectively. When the plural drive sources are arranged close to each other, a common member can house the plural drive sources, thereby reducing the size and simplifying the structure.

Each drive source includes a transmitting portion to transmit power to the blade. The transmitting portion is formed with a drive pin engaging an engagement slot formed in the blade. The driving of the drive pin causes the blade to drive.

Regarding the close arrangement of the drive sources to each other, it is conceivable that the drive pins are arranged close to each other. When a trajectory of the drive pin driving one blade overlaps the engagement slot of the other blade, however, the drive pin driving one blade engages the engagement slot of the other blade. Therefore, the blade is not operated normally. For this reason, regarding the close arrangement of the plural drive sources to each other, there are limitations in the position of the engagement slot or the swing range of the drive pin.

SUMMARY

It is therefore an object of the present invention to provide a blade driving device in which plural drive sources are arranged close to each other and an optical apparatus having the same.

According to an aspect of the present invention, there is provided a blade driving device including: a board including an optical path opening; first and second blades moving toward and away from the optical path opening; first and second transmitting portions driving the first and second blades; and first and second drive sources respectively driving the first and second transmitting portions, wherein the first and second transmitting portions respectively include first and second drive pins, and the first blade includes an engagement slot engaging one of the first and second drive pins and is attached to the first and the second transmitting portions to be rotatable about the other of the first and second drive pins.

DETAILED DESCRIPTION

Figure 1:
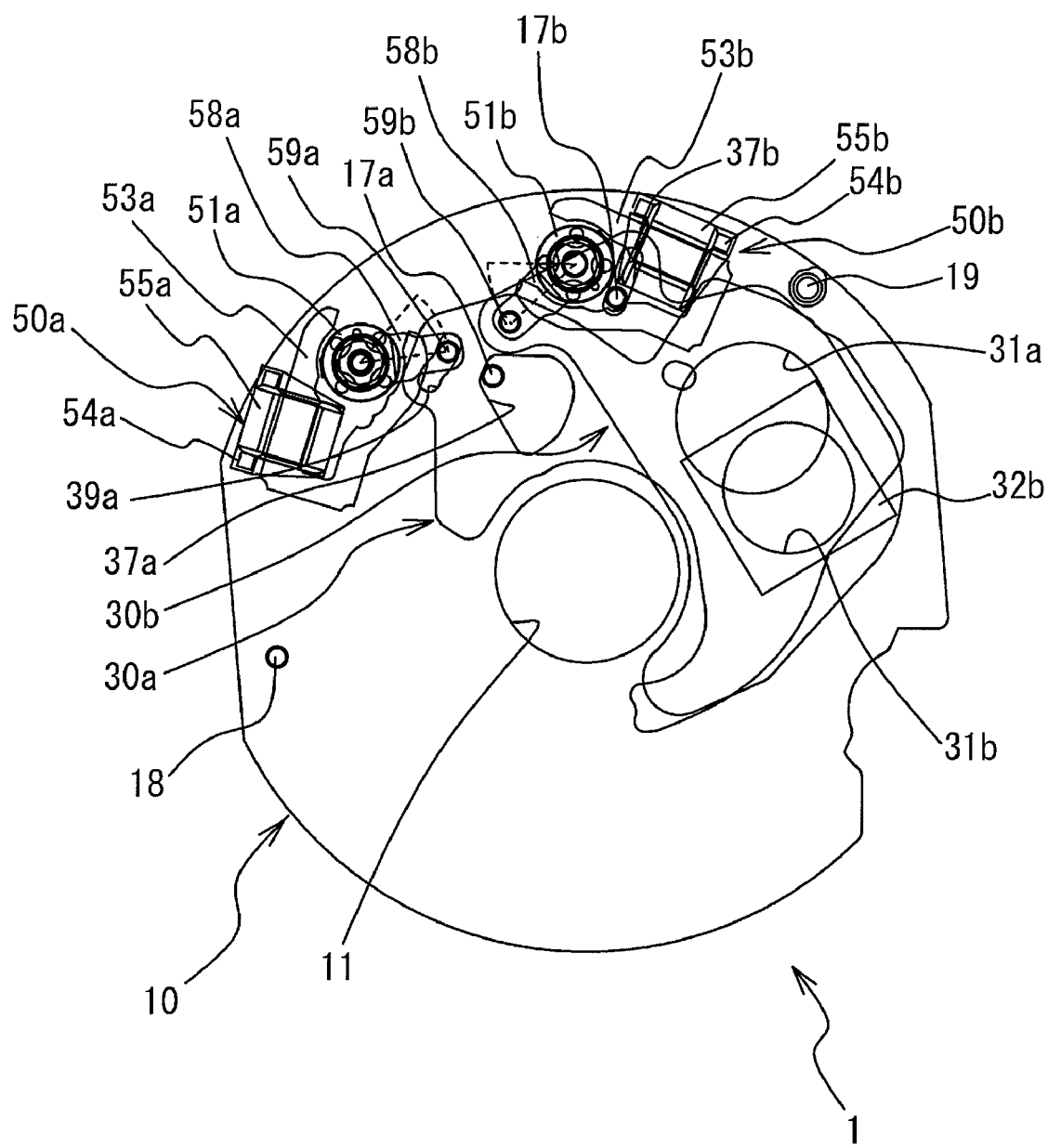
FIG. 1 is a perspective view of a blade driving device 1 according to a present embodiment employed in an optical apparatus.
Figure 2:
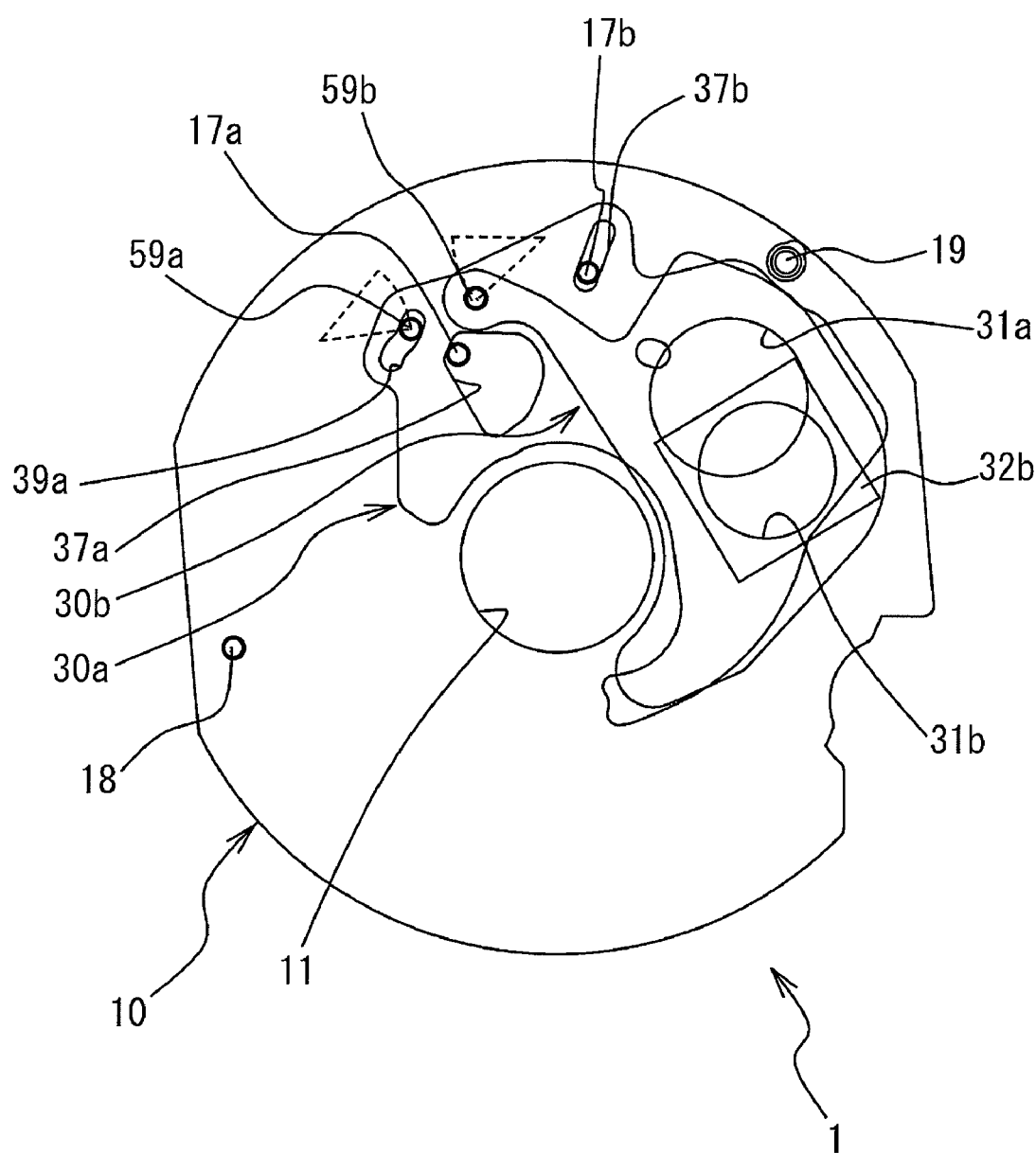
FIG. 2 is a perspective view of the blade driving device 1 with an electromagnetic actuator being omitted.

FIG. 1 is a perspective view of a blade driving device according to a present embodiment employed in an optical apparatus. The blade driving device 1 functions as an aperture device adjusting the amount of light to an imaging element (not illustrated) installed in the optical apparatus. The blade driving device 1 includes a board 10, blades 30a and 30b, and electromagnetic actuators 50a and 50b. FIG. 2 is a perspective view of the blade driving device 1 with the electromagnetic actuators 50a and 50b being omitted. Additionally, drive pins 59a and 59b described later are illustrated in FIG. 2. The blade 30a corresponds to a first blade, and the blade 30b corresponds to the second blade. The electromagnetic actuator 50a corresponds to a first drive source, and the electromagnetic actuator 50b corresponds to a second drive source.

The central portion of the board 10 is provided with an optical path opening 11 through which light passes from the object side. The blades 30a and 30b adjust the amount of light passing through the optical path opening 11. The blades 30a and 30b move toward and away from the optical path opening 11.

The blades 30a and 30b are arranged on the front side of the board 10 in FIG. 1. The electromagnetic actuators 50a and 50b are arranged on the rear side of the board 10. The blade 30a is provided with an aperture 31a. The diameter of the aperture 31a is smaller than that of the optical path opening 11. The aperture 31a and the optical path opening 11 overlap each other, thereby reducing the amount of light passing through the optical path opening 11.

The blade 30b is provided with an aperture 31b. The diameter of the aperture 31b is smaller than that of each of the optical path opening 11 and the aperture 31a. Also, an ND filter 32b is stuck on the blade 30b to cover the aperture 31b.

The state where the blades 30a and 30b recede from the optical path opening 11 is referred to as a fully opened state (a first state). In the fully opened state, the amount of light passing through the optical path opening 11 is maximum. FIGS. 1 and 2 illustrate the blade driving device 1 in the fully opened state. The state where the blade 30a overlaps the optical path opening 11 and the blade 30b recedes from the optical path opening 11 is referred to as a first aperture state (a second state). The state where the blade 30b overlaps the optical path opening 11 and the blade 30a recedes from the optical path opening 11 is referred to as a second aperture state (a third state). The amount of light passing through the optical path opening 11 in the second aperture state is smaller than that in the first aperture state.

The blade 30a is provided with an opening 37a. The board 10 is provided with a pin 17a protruding in the optical axis direction. The pin 17a is freely fitted into the opening 37a. The opening 37a is larger than the pin 17a.

The blade 30b is provided with a linear guide slot 37b. The board 10 is provided with a guide pin 17b protruding in the optical axis direction. The guide slot 37b engages the guide pin 17b.

The electromagnetic actuators 50a and 50b drive the blades 30a and 30b. The electromagnetic actuator 50a drives the blade 30a. The electromagnetic actuator 50b drives both blades 30a and 30b.

The electromagnetic actuator 50a will be simply described. The electromagnetic actuator 50a includes a rotor 51a, a stator 53a, a coil bobbin 54a, and a coil 55a. The rotor 51a is rotatably supported, and is magnetized to have different polarities in its circumferential direction. The transmitting portion 58a is made of a synthetic resin, and is fixed to a bottom surface side of the rotor 51a to transmit the rotary force of the rotor 51a to the blade 30a. The coil bobbin 54a is made of a synthetic resin, and the coil 55a is wound therearound. The coil bobbin 54a fits on a leg portion of the stator 53a. The stator 53a is excited by the energization of the coil 55a. Attractive and repulsive forces generated between the stator 53a and the rotor 51a cause the rotor 51a to rotate in a predetermined range. The electromagnetic actuator 50b has a structure similar to that of the electromagnetic actuator 50a, and reference numbers a and b in FIG. 1 are replaced with each other to describe the similar structure.

The rotor 51a corresponds to a first rotor. The transmitting portion 58a corresponds to a first transmitting portion. The transmitting portion 58a protrudes in the outward radial direction of the rotor 51a, and engages an engagement slot 39a formed in the blade 30a. The engagement slot 39a has a cam shape. The transmitting portion 58a rotates with the rotor 51a. An end of the transmitting portion 58a is provided with the drive pin 59a, corresponding to a first drive pin, protruding in the optical axis direction. This drive pin 59a engages the engagement slot 39a.

Likewise, the electromagnetic actuator 50b includes: a rotor 51b; a transmitting portion 58b transmitting the rotational force of the rotor 51b to the blades 30a and 30b. The rotor 51b corresponds to a second rotor. The transmitting portion 58b corresponds to a second transmitting portion. The transmitting portion 58b is provided with the drive pin 59b corresponding to a second drive pin. The drive pin 59b fits into fitting holes respectively formed in the blades 30a and 30b. Specifically, the blades 30a and 30b are rotatably fitted onto the drive pin 59b. Also, the engagement slot 39a of the blade 30a engages the drive pin 59a. Thus, the blade 30a is attached to the transmitting portions 58a and 58b to be rotatable about the drive pin 59b.

The board 10 is provided with escape slots (not illustrated) respectively escape the movements of the drive pins 59a and 59b and each having an arc shape. Further, the trajectories of the swing movements of the drive pins 59a and 59b are illustrated by dotted lines in FIGS. 1 through 5. The rotors 51a and 51b can stop at the both ends of the swing ranges respectively. Specifically, stoppers (not illustrated) are provided for restricting the swing ranges.

The rotor 51a rotates to swing the drive pin 59a in a predetermined range. This causes the blade 30a to swing about the drive pin 59b. The rotor 51b rotates to swing the drive pin 59b in a predetermined range. Because the drive pin 59b is fitted onto both blades 30a and 30b, the swing movement of the drive pin 59b causes both of the blades 30a and 30b to move. This will be described later in detail.

Figure 3:
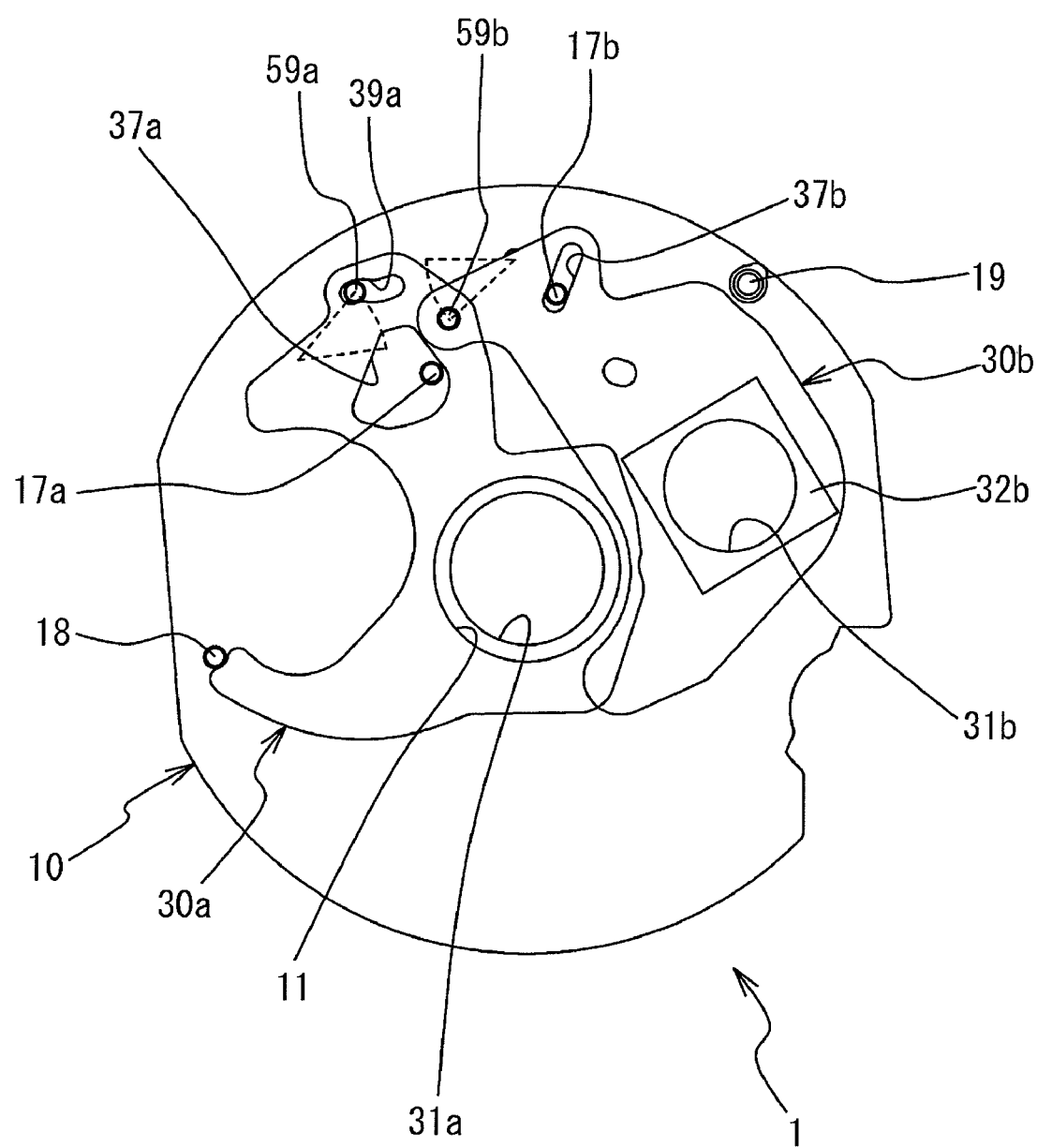
FIG. 3 is a perspective view of the blade driving device 1 in a first aperture state.

FIG. 3 is a perspective view of the blade driving device 1 in the first aperture state. The fully opened state is shifted to the first aperture state by the driving of the electromagnetic actuator 50a only. When the rotor 51a rotates from the fully opened state illustrated in FIGS. 1 and 2, the drive pin 59a moves within the engagement slot 39a and the blade 30a swings about the drive pin 59b. This swings the blade 30a toward the position to overlap the optical path opening 11. Additionally, the blade 30a abuts a stopper pin 18 provided in the board 10 in the first aperture state. Therefore, a position of the blade 30a is defined in the first aperture state. Further, while the first aperture state is being shifted from the fully opened state, the blade 30b stops its movement.

Figure 4:
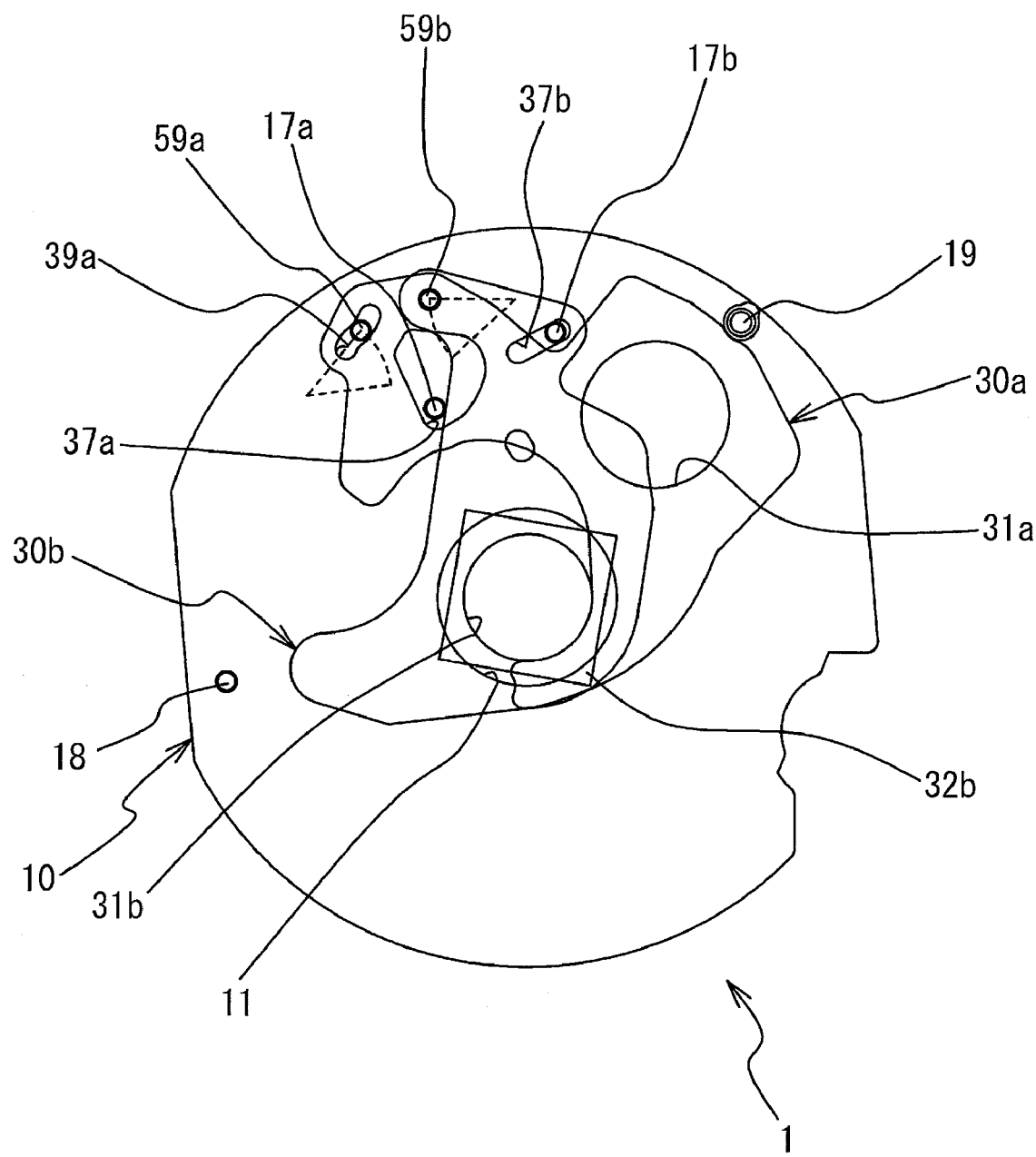
FIG. 4 is a perspective view of the blade driving device 1 in a second aperture state.

FIG. 4 is a perspective view of the blade driving device 1 in the second aperture state. The second aperture state is shifted from the first aperture state by the driving of the electromagnetic actuator 50b only. When the rotor 51b rotates from the first aperture state illustrated in FIG. 3, the blade 30a rotates about the drive pin 59b to recede from the optical path opening 11 with the engagement slot 39a and the drive pin 59a being engaged with each other. At this time, the drive pin 59a moves toward the center of the engagement slot 39a. The blade 30b rotates about the drive pin 59b to swing toward the position to overlap the optical path opening 11 with the guide slot 37b and the guide pin 17b provided in the board 10 being engaged with each other. At this time, the swing of the blade 30b is guided such that the guide slot 37b moves relative to the guide pin 17b.

Additionally, the blade 30b abuts the pin 17a in the second aperture state. This defines the overlapping position of the blade 30b. The blade 30a receding from the optical path opening 11 abuts a stopper pin 19 provided in the board 10. This defines the receding position of the blade 30a.

As described above, the blade driving device 1 shifts from the fully opened state to the first aperture state, and shifts from the first aperture state to the second aperture state. The fully opened state is shifted to the second aperture state by the driving of both electromagnetic actuators 50a and 50b.

Herein, the blade 30a is rotatably attached on the transmitting portions 58a and 58b. In other words, the blade 30a is provided with the engagement slot 39a engaging the drive pin 59a, and is rotatably fitted onto the drive pin 59b. Thus, the distance between the engagement slot 39a of the first blade and the drive pin 59b is always constant. For this reason, the engagement slot 39a of the blade 30a does not overlap the trajectory of the drive pin 59b. Thus, even when the drive pins 59a and 59b are arranged close to each other, the drive pin 59b does not engage the engagement slot 39a of the blade 30a. Therefore, the transmitting portions 58a and 58b can be arranged close to each other, thereby arranging the electromagnetic actuators 50a are 50b close to each other. This reduces the size of the blade driving device 1.

Further, the electromagnetic actuators 50a and 50b are arranged close to each other in such a way, thereby achieving commonality of a member for housing both actuators. Furthermore, a printed circuit board (not illustrated) is commonly used for supplying the electromagnetic actuators 50a and 50b with the power. Thus, the electromagnetic actuators 50a and 50b are arranged close to each other, thereby achieving the reduced size of the blade driving device 1.

Additionally, when two blades are driven by a single drive source in a conventional blade driving device, shapes of cams respectively provided in the blades are complicated. Thus, the size of the cam engaging the drive pin might increase. The size of the blade increase as the size of the cam shape increases.

Moreover, the transmitting portions 58a and 58b face each other. Thus, the blades 30a and 30b driven by the transmitting portions 58a and 58b are arranged to overlap each other in a large portion. This can eliminate the space where the blades 30a and 30b move, thereby reducing the size of the blade driving device 1.

Further, as mentioned above, the driving of only the electromagnetic actuator 50b causes both of the blades 30a and 30b to drive. Therefore, the electrical power consumption can be suppressed, as compared with a case where the first and second blades are independently driven by the first and second drive sources respectively.

Each of the rotors 51a and 51b can stop only at both ends of its rotational range. Therefore, the cost can be suppressed, as compared with a case where an actuator having a rotor capable of stopping at three positions of both ends and a partway of its rotational range is employed. Specifically, the cost is more suppressed in the case where two actuators each having a rotor capable of stopping only at both ends of the rotational range are employed, as compared with the case where the above actuators are employed. Also, when a rotor is stopped at a partway of the rotational range, a problem such as a hunting may occur.

Also, in the fully opened state where the blades 30a and 30b recede from the optical path opening 11, the blades 30a and 30b are arranged in the same side with respect to the optical path opening 11 while overlapping each other. Therefore, the size of the space in which the blades 30a and 30b move can be reduced as compared with a case where the blades 30a and 30b recede from the optical path opening 11 to interpose the optical path opening 11 therebetween.

A variation of the blade driving device will be described below. Additionally, the like components in the blade driving device 1 described above are designated with the same reference numerals and the duplication description is omitted.

Figure 5:
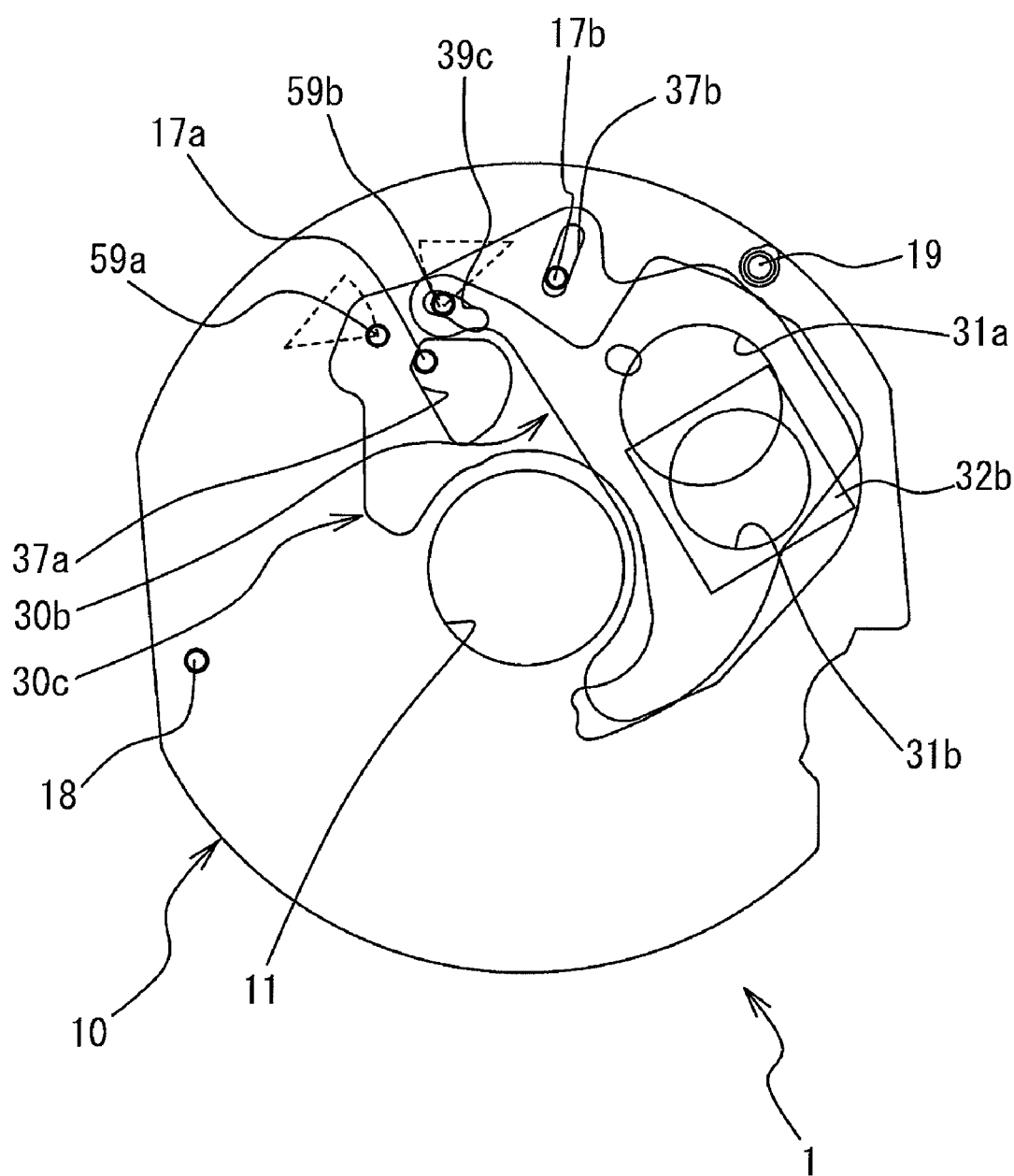
FIG. 5 is a perspective view of the blade driving device 1 according to a variation in a first aperture state.

FIG. 5 is a perspective view of the variation of the blade driving device 1 in the first aperture state. As illustrated in FIG. 5, the drive pin 59a formed in the transmitting portion 58a fits into a fitting hole provided in a blade 30c. Also, the drive pin 59b formed in the transmitting portion 58b engages an engagement slot 39c having a cam shape formed in the blade 30c. Thus, the blade 30c is rotatable about the drive pin 59a. That is, the blade 30c is rotatably attached to the transmitting portions 58a and 58b.

Additionally, like the above mentioned embodiment, the fully opened state is shifted to the first aperture state by the driving of the electromagnetic actuator 50a only. The first aperture state is shifted to the second aperture state by the driving of the electromagnetic actuator 50b only (not illustrated).

Thus, the blade 30c is rotatably attached onto the transmitting portions 58a and 58b, in the variation. In other words, the blade 30c has the engagement slot 39c engaging the drive pin 59b, and is rotatably fitted onto the drive pin 59a. Thus, the distance between the fitting hole of the blade 30c and the drive pin 59b is always constant. For this reason, the fitting hole of the blade 30c does not overlap the trajectory of the drive pin 59b. Therefore, the transmitting portions 58a and 58b can be arranged closer to each other, thereby the electromagnetic actuators 50a and 50b can be arranged closer to each other. This reduces the size of the blade driving device 1.

As discussed above, the first blade has the engagement slot engaging one of the first drive pin 59a and the second drive pin 59b, and is attached to the first transmitting portion 58a and the second transmitting portion 58b to be rotatable about the other of the first drive pin 59a and the second drive pin 59b.

While the exemplary embodiments of the present invention have been illustrated in detail, the present invention is not limited to the above-mentioned embodiments, and other embodiments, variations and modifications may be made without departing from the scope of the present invention.

The blade 30b may be not provided with the ND filter 32b in the embodiment.

Finally, several aspects of the present invention are summarized as follows.

According to an aspect of the present invention, there is provided a blade driving device including: a board including an optical path opening;

first and second blades moving toward and away from the optical path opening; first and second transmitting portions driving the first and second blades; and first and second drive sources respectively driving the first and second transmitting portions, wherein the first and second transmitting portions respectively include first and second drive pins, and the first blade includes an engagement slot engaging one of the first and second drive pins and is attached to the first and the second transmitting portions to be rotatable about the other of the first and second drive pins.

The first blade is rotatably attached to the first and second transmitting portions. Thus, a distance between the engagement slot of the first blade and the first or second drive pin as a rotation center of the first blade is always constant. For this reason, the trajectory of the first or second drive pin does not overlap the engagement slot of the first blade. Thus, even when the first and second drive pins are adjacently arranged, the first or second drive pin does not engage the engagement slot of the first blade. Therefore, the first and second transmitting portions can be arranged close to each other. This can arrange the first and second drive sources close to each other.

In the above configuration, the board may include a guide pin guiding movement of the second blade, the first blade may include the engagement slot engaging the first drive pin and is rotatably fitted onto the second drive pin, and the second blade may include a guide slot engaging the guide pin and be rotatably fitted onto the second drive pin.

The first blade engages the first drive pin, and is rotatably fitted onto the second drive pin. Thus, a distance between the engagement slot of the first blade and the second drive pin is always constant. For this reason, the trajectory of the second drive pin does not overlap the engagement slot of the first blade. Thus, even if the first and second drive pins are arranged close to each other, the second drive pin does not engage the engagement slot of the first blade. Therefore, the first and second transmitting portions can be adjacently arranged. This can adjacently arrange the first and second drive sources.

Also, an optical apparatus may include the blade driving device.

What is claimed is:

1. A blade driving device comprising:
a board including an optical path opening;
first and second blades moving toward and away from the optical path opening;
first and second transmitting portions driving the first and second blades; and
first and second drive sources respectively driving the first and second transmitting portions,
wherein the first and second transmitting portions respectively include first and second drive pins, and
the first blade includes an engagement slot engaging one of the first and second drive pins and is attached to the first and the second transmitting portions to be rotatable about the other of the first and second drive pins.

2. The blade driving device of claim 1, wherein
the board includes a guide pin guiding movement of the second blade, the first blade includes the engagement slot engaging the first drive pin and is rotatably fitted onto the second drive pin, and the second blade includes a guide slot engaging the guide pin and is rotatably fitted onto the second drive pin.

3. The blade driving device of claim 1, wherein the first and second transmitting portions face each other.

4. The blade driving device of claim 1, wherein the first blade is driven by the first drive pin, and the first and second blades are driven by the second drive pin.

5. The blade driving device of claim 1, wherein the first and second drive sources respectively include first and second rotors, and the first and second rotors are capable of stopping only at both ends of rotational ranges of the first and second rotors, respectively.

6. The blade driving device of claim 1, wherein the first and second blades are arranged in the same side with respect to the optical path opening while overlapping each other in a state where the first and second blades recede from the optical path opening.

7. The blade driving device of claim 1, wherein a state is capable of shifting to any one of a first state where the first and second blades recede from the optical path opening, a second state where the first blade overlaps the optical path opening and the second blade recedes from the optical path opening, and a third state where the second blade overlaps the optical path opening and the first blade recedes from the optical path opening.

8. The blade driving device of claim 1, wherein the first and second blades respectively include first and second openings, each of diameters of the first and second openings being smaller than a diameter of the optical path opening.

9. An optical apparatus comprising a blasé drive mechanism, the blade drive mechanism including:

a board including an optical path opening;

first and second blades moving toward and away from the optical path opening;

first and second transmitting portions driving the first and second blades; and first and second drive sources respectively driving the first and second transmitting portions, wherein the first and second transmitting portions respectively include first and second drive pins, and the first blade includes an engagement slot engaging one of the first and second drive pins and is attached to the first and the second transmitting portions to be rotatable about the other of the first and second drive pins.

\* \* \* \* \*